United States Patent
Kazmi et al.

(10) Patent No.: US 10,044,613 B2
(45) Date of Patent: Aug. 7, 2018

(54) MULTIPLE RADIO LINK CONTROL (RLC) GROUPS

(71) Applicant: INTEL IP CORPORATION, Santa Clara, CA (US)

(72) Inventors: Zaigham Kazmi, San Marcos, CA (US); Ana Lucia Pinheiro, Portland, OR (US)

(73) Assignee: Intel IP Corporation, Santa Clara, CA (US)

(*) Notice: Subject to any disclaimer, the term of this patent is extended or adjusted under 35 U.S.C. 154(b) by 195 days.

(21) Appl. No.: 14/785,116

(22) PCT Filed: Dec. 13, 2013

(86) PCT No.: PCT/US2013/074861
§ 371 (c)(1),
(2) Date: Oct. 16, 2015

(87) PCT Pub. No.: WO2014/185953
PCT Pub. Date: Nov. 20, 2014

(65) Prior Publication Data
US 2016/0094446 A1   Mar. 31, 2016

Related U.S. Application Data

(60) Provisional application No. 61/824,338, filed on May 16, 2013.

(51) Int. Cl.
*H04L 12/741* (2013.01)
*H04W 72/04* (2009.01)
(Continued)

(52) U.S. Cl.
CPC ............ *H04L 45/74* (2013.01); *G01C 21/005* (2013.01); *G01S 19/12* (2013.01);
(Continued)

(58) Field of Classification Search
CPC ............... H04L 45/74; H04L 12/6418; H04W 28/0252; H04W 72/0433; H04W 4/02;
(Continued)

(56) References Cited

U.S. PATENT DOCUMENTS

2005/0073974 A1* 4/2005 Kim ...................... H04L 12/189
370/329
2012/0281666 A1   11/2012 Diachina et al.
(Continued)

FOREIGN PATENT DOCUMENTS

CN    102655682 A    9/2012
EP    2916572 A1 *  9/2015  ........ H04W 72/0406

OTHER PUBLICATIONS

3GPP TSG-RAN WG2 #81—R2-130420: Protocol architecture alternatives for dual connectivity; Agenda Item 7.2; Jan. 28 to Feb. 1, 2013; Malta.
(Continued)

*Primary Examiner* — Jackie Zuniga Abad
(74) *Attorney, Agent, or Firm* — Thorpe North & Western

(57) ABSTRACT

Technology to process radio link control (RLC) groups is disclosed. In an example, a carrier aggregation (CA) capable user equipment (UE) operable process radio link control (RLC) groups can include a UE radio frequency (RF) transceiver and a processor. The UE RF transceiver can be configured to receive packets from more than one cell via a sending node RF transceiver. The processor can be configured to process service data units (SDU) of the packets in a radio link control (RLC) entity of a protocol stack (PS). Each SDU can be associated with an RLC flow identifier (RFI). The RFI can comprise an RLC group identifier (RGI) indicating the sending node RF transceiver, and a radio bearer identifier (RBID).

28 Claims, 15 Drawing Sheets

(51) Int. Cl.
*H04W 4/02* (2018.01)
*H04L 12/64* (2006.01)
*G01C 21/00* (2006.01)
*G01S 19/12* (2010.01)
*H04W 28/02* (2009.01)
*H04W 84/12* (2009.01)
*H04W 88/06* (2009.01)
*H04W 16/18* (2009.01)

(52) U.S. Cl.
CPC ........... *H04L 12/6418* (2013.01); *H04W 4/02* (2013.01); *H04W 28/0252* (2013.01); *H04W 72/0433* (2013.01); *H04W 72/0453* (2013.01); *H04W 16/18* (2013.01); *H04W 84/12* (2013.01); *H04W 88/06* (2013.01)

(58) Field of Classification Search
CPC ... H04W 72/0453; G01C 21/005; G01S 19/12
See application file for complete search history.

(56) References Cited

U.S. PATENT DOCUMENTS

2013/0083783 A1  4/2013  Gupta et al.
2013/0301547 A1*  11/2013  Gupta ............... H04W 76/048
                                                          370/329
2014/0010192 A1  1/2014  Chang et al.

OTHER PUBLICATIONS

3GPP TSG RAN WG2 Meeting #81bis—R2-131529: Impacts of Splitting a Single EPS Bearer between Two (or more) eNBs; Agenda Item 7.2; Apr. 15 to Apr. 19, 2013; Chicago, USA.

3GPP TSG RAN 2G2 Meeting #81bis—R2-131350: Discussion on protocol architecture comparison for dual connectivity; Agenda Item 7.2; Apr. 15 to Apr. 19, 2013; Chicago USA.

3GPP TSG-RAN WG2 Meeting #81bis—R2-131174: Protocol architecture for dual connectivity; Agenda Item 7.2; Apr. 15 to Apr. 19, 2013; Chicago, USA.

3GPP TWG-RAN WG2 Meeting #81bis—R2-131164: Study of Solutions and Radio Protocol Architecture for Dual-Connectivity; Agenda Item 7.2; Apr. 15 to Apr. 19, 2013; Chicago USA.

Office Action dated Sep. 18, 2017, in European Patent Application No. 13884528.4, filed Dec. 13, 2013; 10 pages.

* cited by examiner

MULTIPLE RADIO LINK CONTROL (RLC) GROUPS

RELATED APPLICATIONS

This application claims the benefit of and hereby incorporates by reference U.S. Provisional Patent Application Ser. No. 61/824,338, filed May 16, 2013.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In computer networking and/or wireless communication, different functions can be provided by different layers in a protocol stack. The protocol stack (PS) can be an implementation of a computer networking protocol suite. The protocol stack (or protocol suite) can include the definition and implementation of the protocols. Each layer or protocol in the protocol stack can provide a specified function. The modularization of the layers and protocols can make design and evaluation of the computer networking and/or wireless communication easier. In an example, each protocol module or layer module in a stack of protocols may communicate with at least two other modules (e.g., a higher layer and a lower layer). The lowest protocol or layer can provide low-level, physical interaction with the hardware. Each higher layer may add more features. The upper or topmost layers can include user applications and services.

In the LTE system, communication layers can include a physical (PHY) (i.e., layer 1 (L1)), a data link (i.e., layer 2 (L2)), a network (i.e., layer 3 (L3)), and an application layer. In an example, layer 2 (L2) can include media access control (MAC), radio link control (RLC), or packet data convergence protocol (PDCP) layers, and layer 3 (L3) can include a radio resource control (RRC) layer, non-access stratum (NAS), and internet protocol (IP). In an example, the RRC protocol can manage control plane signaling between a wireless device (e.g., a user equipment (UE)) and a radio access network (RAN) via the node (e.g., an eNB).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
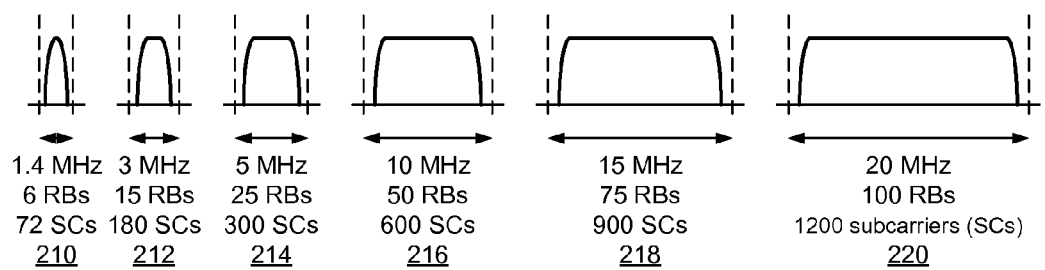
FIG. 1 illustrates a block diagram of various component carrier (CC) bandwidths in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An increase in the amount of wireless data transmission has created congestion in wireless networks using licensed spectrum to provide wireless communication services for wireless devices, such as smart phones and tablet devices. The congestion is especially apparent in high density and high use locations such as urban locations and universities.

One technique for providing additional bandwidth capacity to wireless devices is through the use carrier aggregation of multiple smaller bandwidths to form a virtual wideband channel at a wireless device (e.g., UE). In carrier aggregation (CA) multiple component carriers (CC) can be aggregated and jointly used for transmission to/from a single terminal Carriers can be signals in permitted frequency domains onto which information is placed. The amount of information that can be placed on a carrier can be determined by the aggregated carrier's bandwidth in the frequency domain. The permitted frequency domains are often limited in bandwidth. The bandwidth limitations can become more severe when a large number of users are simultaneously using the bandwidth in the permitted frequency domains.

FIG. 1 illustrates a carrier bandwidth, signal bandwidth, or a component carrier (CC) that can be used by the wireless device. For example, the LTE CC bandwidths can include: 1.4 MHz 210, 3 MHz 212, 5 MHz 214, 10 MHz 216, 15 MHz 218, and 20 MHz 220. The 1.4 MHz CC can include 6 resource blocks (RBs) comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

Carrier aggregation (CA) enables multiple carrier signals to be simultaneously communicated between a user's wireless device and a node. Multiple different carriers can be used. In some instances, the carriers may be from different permitted frequency domains. Carrier aggregation provides a broader choice to the wireless devices, enabling more bandwidth to be obtained. The greater bandwidth can be used to communicate bandwidth intensive operations, such as streaming video or communicating large data files.

Figure 2A:
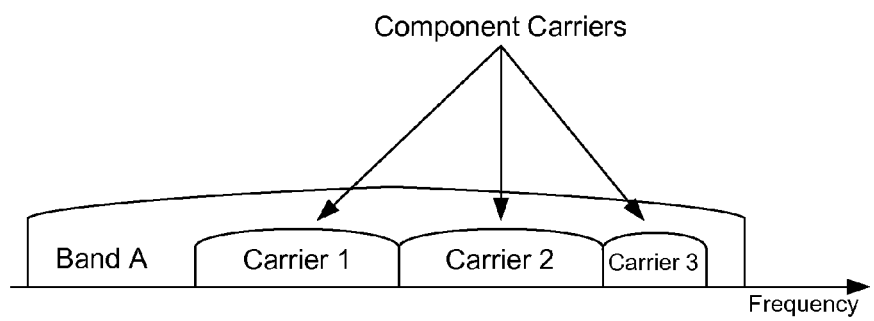
FIG. 2A illustrates a block diagram of multiple contiguous component carriers in accordance with an example.

FIG. 2A illustrates an example of carrier aggregation of continuous carriers. In the example, three carriers are contiguously located along a frequency band. Each carrier can be referred to as a component carrier. In a continuous type of system, the component carriers are located adjacent one another and can be typically located within a single frequency band (e.g., band A). A frequency band can be a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band. In contiguous carrier aggregation, only one fast Fourier transform (FFT) module and/or one radio frontend may be used. The contiguous component carriers can have similar propagation characteristics which can utilize similar reports and/or processing modules.

Figure 2B:
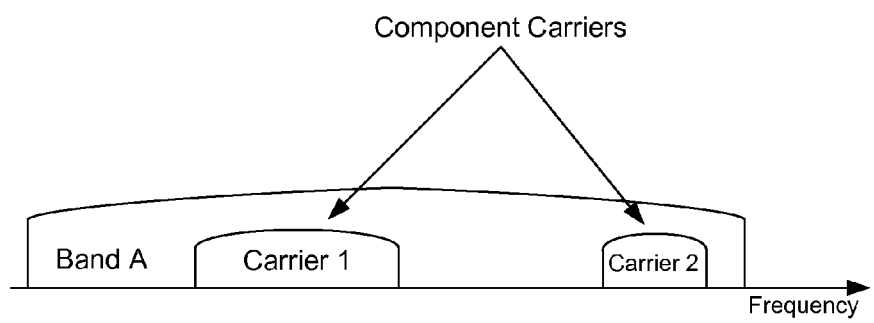
FIG. 2B illustrates a block diagram of intra-band non-contiguous component carriers in accordance with an example.
Figure 2C:
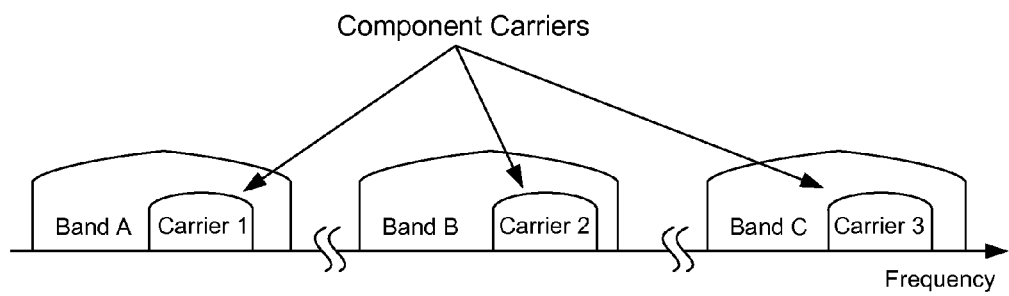
FIG. 2C illustrates a block diagram of inter-band non-contiguous component carriers in accordance with an example.

FIGS. 2B-2C illustrates an example of carrier aggregation of non-continuous component carriers. The non-continuous component carriers may be separated along the frequency range. Each component carrier may even be located in different frequency bands. Non-contiguous carrier aggregation can provide aggregation of a fragmented spectrum. Intra-band (or single-band) non-contiguous carrier aggregation provides non-contiguous carrier aggregation within a same frequency band (e.g., band A), as illustrated in FIG. 2B. Inter-band (or multi-band) non-contiguous carrier aggregation provides non-contiguous carrier aggregation within different frequency bands (e.g., bands A, B, or C), as illustrated in FIG. 2C. The ability to use component carriers in different frequency bands can enable more efficient use of available bandwidth and increases the aggregated data throughput.

Figure 3A:
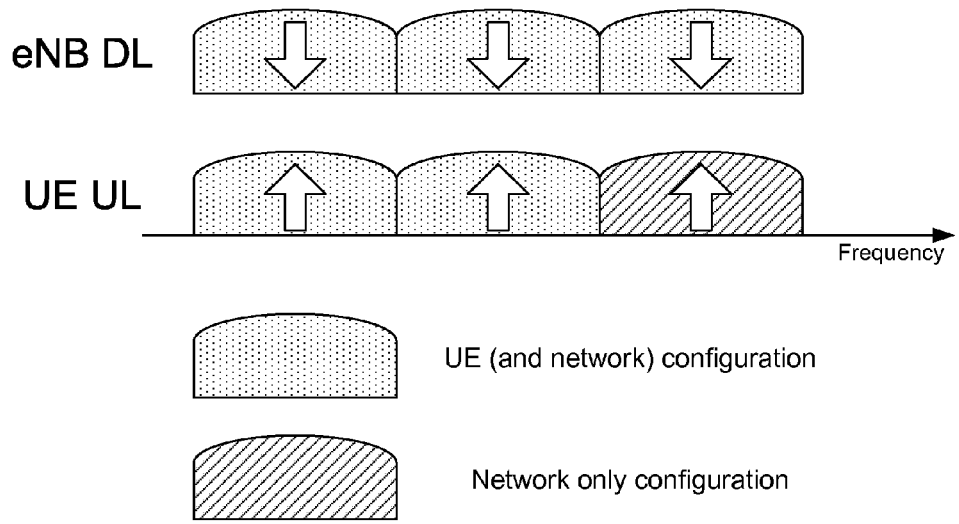
FIG. 3A illustrates a block diagram of a symmetric-asymmetric carrier aggregation configuration in accordance with an example.
Figure 3B:
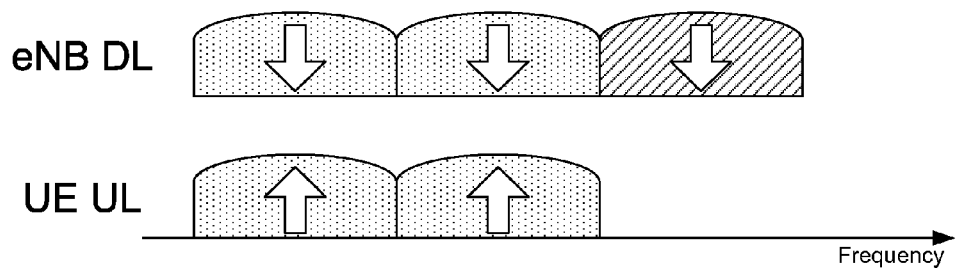
FIG. 3B illustrates a block diagram of an asymmetric-symmetric carrier aggregation configuration in accordance with an example.

Network symmetric (or asymmetric) carrier aggregation can be defined by a number of downlink (DL) and uplink (UL) component carriers offered by a network in a sector. UE symmetric (or asymmetric) carrier aggregation can be defined by a number of downlink (DL) and uplink (UL) component carriers configured for a UE. The number of DL CCs may be at least the number of UL CCs. A system information block type 2 (SIB2) can provide specific linking between the DL and the UL. FIG. 3A illustrates a block diagram of a symmetric-asymmetric carrier aggregation configuration, where the carrier aggregation is symmetric between the DL and UL for the network and asymmetric between the DL and UL for the UE. FIG. 3B illustrates a block diagram of an asymmetric-symmetric carrier aggregation configuration, where the carrier aggregation is asymmetric between the DL and UL for the network and symmetric between the DL and UL for the UE.

For each UE, a CC can be defined as a primary cell (PCell). Different UEs may not necessarily use a same CC as their PCell. The PCell can be regarded as an anchor carrier for the UE and the PCell can thus be used for control signaling functionalities, such as radio link failure monitoring, hybrid automatic repeat request-acknowledgement (HARQ-ACK), and PUCCH resource allocations (RA). If more than one CC is configured for a UE, the additional CCs can be denoted as secondary cells (SCells) for the UE.

Carrier aggregation can be used in homogeneous or heterogeneous networks. In homogeneous networks, the node, also called a macro node, can provide basic wireless coverage to wireless devices in a cell. The cell can be the area in which the wireless devices are operable to communicate with the macro node. Heterogeneous networks (HetNets) are used to handle the increased traffic loads on the macro nodes due to increased usage and functionality of wireless devices. HetNets can include a layer of planned high power macro nodes (or macro-eNBs) overlaid with layers of small cell nodes or lower power nodes (micro-eNBs, pico-eNBs, femto-eNBs, or home eNBs [HeNBs]) that can be deployed in a less well planned or even entirely uncoordinated manner within the coverage area (cell) of a macro node. The lower power nodes can generally be referred to as "low power nodes". The macro node can be used for basic coverage, and the low power nodes can be used to fill coverage holes, to improve capacity in hot-zones or at the boundaries between the macro nodes' coverage areas, and improve indoor coverage where building structures impede signal transmission. HetNets can be used to optimize performance particularly for unequal user or traffic distribution and improve spectral efficiency (SE) per unit area of a cell. HetNets can also achieve significantly improved overall capacity and cell-edge performance. The nodes, such as the macro nodes and/or lower power nodes (LPN), can also be grouped together with other transmission stations in a Coordinated MultiPoint (CoMP) system where transmission stations from multiple cells can transmit signals to the wireless device and receive signals from the wireless device.

Data (e.g., packets) from a wired network (e.g., Internet) can be processed via a protocol stack (PS) at a node (e.g., LTE eNodeB). The node in a RAN can be coupled to the Internet via a core network (CN) or an LTE evolved packet core (EPC). The EPC can include various core network devices, such as a serving gateway (SGW) and a packet data network (PDN) gateway (PGW). Core network devices or nodes can be in direct communication with each other via cabling, wire, optical fiber, and/or transmission hardware, such a router or repeater. The SGW can provide network access for the UEs associated with the RAN. The SGW can route and forward user data packets, while acting as a mobility anchor for a user plane during inter-eNodeB handovers and as an anchor for mobility between LTE and other 3GPP technologies. For idle state UEs, the SGW can terminate the downlink data path and triggers paging when downlink data arrives for the UE. The SGW can manage and store UE contexts, parameters of the IP bearer service, and network internal routing information. The SGW can perform replication of the user traffic in case of lawful interception.

The PDN gateway (PGW) can provide connectivity from the wireless device to external packet data networks by being the point of exit and entry of traffic for the wireless device. A wireless device can have simultaneous connectivity with more than one PGW for accessing multiple PDNs. The PGW can perform policy enforcement, packet filtering for each user, charging support, lawful interception and packet screening. The PGW can act as the anchor for mobility between 3GPP and non-3GPP technologies such as WiMAX and 3GPP2.

Figure 4:
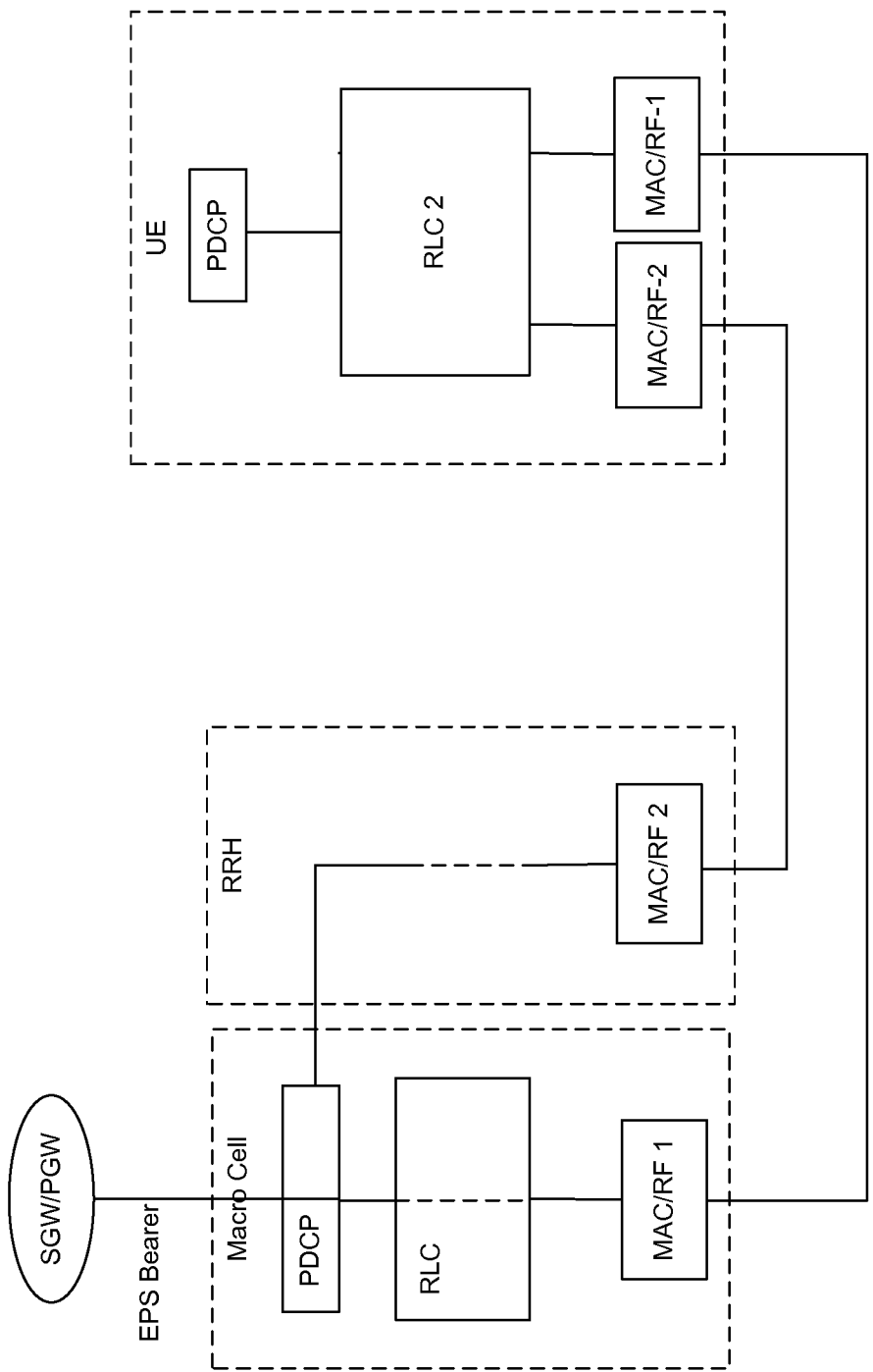
FIG. 4 illustrates a diagram of a carrier aggregation (CA) architecture for a protocol stack (PS) in accordance with an example.

A UE (e.g., CA capable UE) can be configured for carrier aggregation and support dual connectivity (e.g., to multiple nodes (e.g., eNB)) for a faster and/or more reliable data connection. In legacy configurations (e.g., 3GPP LTE releases 10 or 11), the protocol stack (e.g., PDCP, RLC, and upper MAC) can be common (e.g., for a macro cell and small cell, such as a remote radio head (RRH)) and the lower MAC and PHY can be duplicated for each serving cell, as shown in FIG. 4. With the legacy configuration, one RLC entity can be used for data transfer, which can simplify data processing especially in terms of time sensitive segmentation (SGMT) and/or automatic repeat request (ARQ), service data unit (SDU) reordering, and so forth. For example, each data radio bearer (DRB) can be split between two radio frequency (RF) transceivers (e.g., MAC/RF 1 and MAC/RF 2) and can be assembled at MAC-RLC service access point (SAP) (e.g., RLC 2) of the UE.

The data radio bearer (DRB) can be a bearer for the internet protocol (IP) packets from the IP layer. A bearer is a virtual concept that can define how UE data (e.g., packets) is treated when the data travels across the network. For instance, the network might treat some data in a special way and treat others normally. Some flow of data might be provided guaranteed bit rate while other may have a low transfer. A bearer can be a set of network parameters that defines specific treatment of data. A signaling radio bearer (SRB) can be used to carry signaling. The data radio bearer (DRB) can used carry user data, which can be associated with an evolved packet system (EPS) bearer. In an EPS connection-oriented transmission network, the establishment of a "virtual" connection (e.g., EPS bearer) between two endpoints (e.g. a UE and a PDN-GW) may be made before traffic can be sent between those endpoints. The bearer can provide a transport service with specific quality of service (QoS) attributes.

The service data unit (SDU) can be upper layer data which can be converted to a protocol data unit (PDU) by a lower layer, or the lower layer data (e.g., PDU) can be converted to the SDU by an upper layer. The following provides a brief description of some layers in the protocol stack and entities or modules associated with each of the described layers. For example, the physical (PHY) layer can carry information from the media access control (MAC) transport channels over the air interface. The PHY can manage link adaptation (e.g., adaptive modulation and coding (AMC)), power control, cell search (e.g., for initial synchronization and handover purposes), and/or other measurements (e.g., inside the LTE system and between systems) for the RRC layer.

The media access control (MAC) layer can provide mapping between logical channels and transport channels, multiplexing of MAC SDUs from one or different logical channels onto transport blocks (TB) to be delivered to the physical layer on transport channels, de-multiplexing of MAC SDUs from one or different logical channels from transport blocks (TB) delivered from the physical layer on transport channels, scheduling information reporting, error correction through hybrid automatic repeat request (HARQ), priority handling between UEs by means of dynamic scheduling, priority handling between logical channels of one UE, and/or logical channel prioritization. In an example, the upper MAC can provide functions related to the RLC (e.g., multiplexing or de-multiplexing of MAC SDUs and/or scheduling), and the lower MAC can provide the other MAC functions (e.g., error correction through HARQ). In another example, the lower MAC can include all MAC functions.

The radio link control (RLC) can operates in three modes of operation: transparent mode (TM), unacknowledged mode (UM), and acknowledged mode (AM). The RLC layer can transfer upper layer PDUs, error correction through ARQ (e.g., for AM data transfer), concatenation, segmentation and reassembly of RLC SDUs (e.g., for UM and AM data transfer). The RLC can provide re-segmentation of RLC data PDUs (e.g., for AM data transfer), reordering of RLC data PDUs (e.g., for UM and AM data transfer), duplicate detection (e.g., for UM and AM data transfer), RLC SDU discard (e.g., for UM and AM data transfer), RLC re-establishment, and/or protocol error detection (e.g., for AM data transfer).

The radio resource control (RRC) sublayer services and functions can include broadcast of system information related to the non-access stratum (NAS), broadcast of system information related to the access stratum (AS), paging, establishment, maintenance and release of an RRC connection between the UE and E-UTRAN, and/or security functions including key management, establishment, configuration, maintenance and release of point to point radio bearers.

The packet data convergence control (PDCP) layer can provide header compression and decompression of IP data, transfer of data (user plane or control plane), maintenance of PDCP sequence numbers (SNs), in-sequence delivery of upper layer PDUs at re-establishment of lower layers, duplicate elimination of lower layer SDUs at re-establishment of lower layers for radio bearers mapped on RLC AM, ciphering and deciphering of user plane data and control plane data, integrity protection and integrity verification of control plane data, timer based discard, and/or duplicate discarding. The PDCP can be used for signaling radio bearers (SRBs) and data radio bearers (DRBs) mapped on dedicated control channel (DCCH) and dedicated traffic channel (DTCH) type of logical channels.

The non-access stratum (NAS) protocols can support the mobility of the UE and the session management procedures to establish and maintain IP connectivity between the UE and a PDN-GW (PGW).

Figure 5:
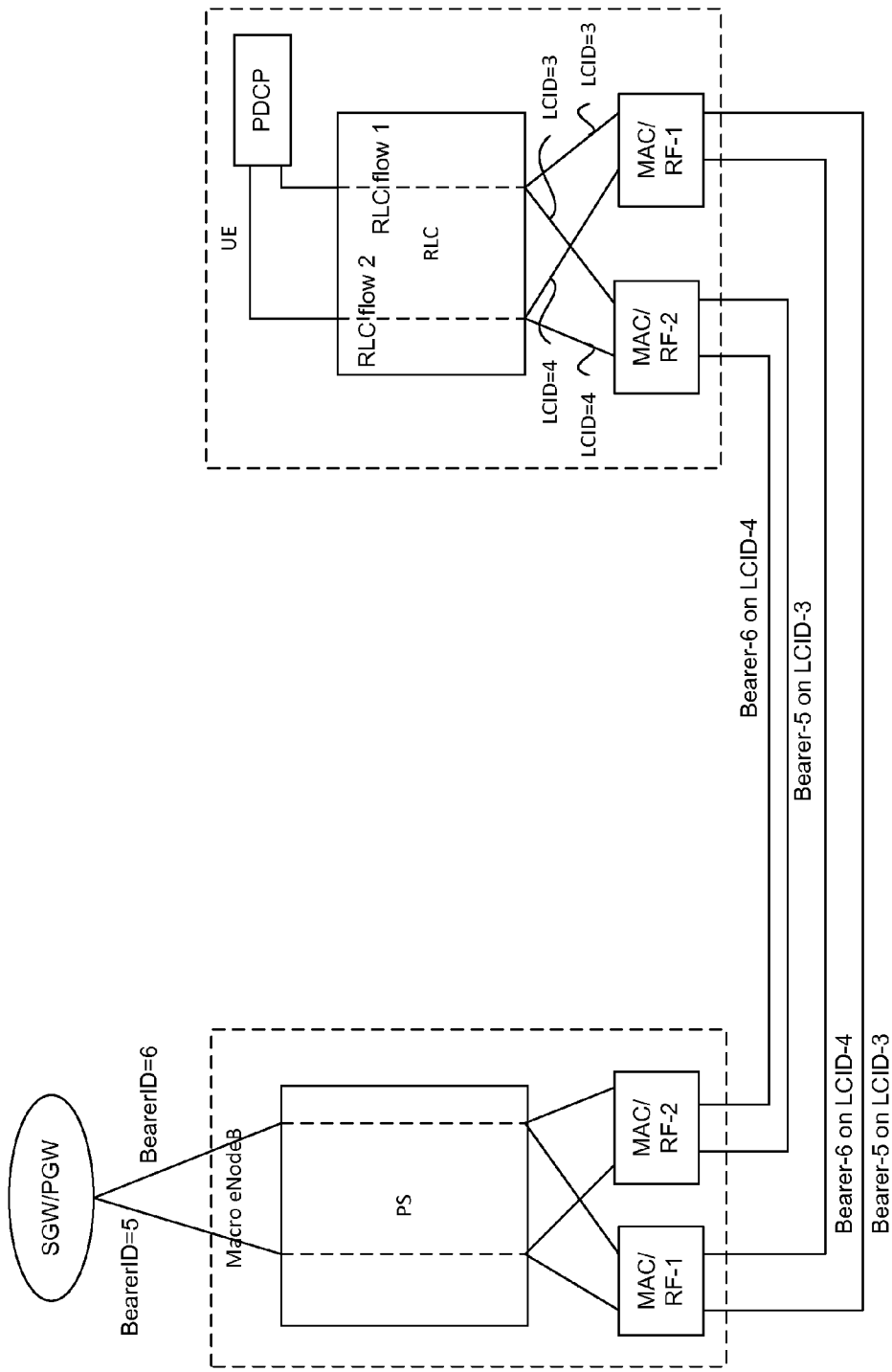
FIG. 5 illustrates a diagram of carrier aggregation (CA) architecture with multiple split evolved packet system (EPS) bearers in accordance with an example.

FIG. 5 an example of a CA architecture with multiple EPS bearers split into different cells. For example, the core network (e.g., SGW/PGW) can send data (e.g., packets) to a node (e.g., macro eNodeB) split between two radio bearer (e.g. Bearer identifier (ID)=5 and Bearer ID=6). The protocol stack (PS) can process each radio bearer data stream and use multiple MAC/RF entities (or MAC/PHY layer entities) to process and transmit the data via an air interface. Each MAC/RF entity can process and transmit data via multiple radio bearers (e.g., EPS bearers). For instance, Bearer-5 (i.e., Bearer ID=S) can be mapped to logical channel identifier-3 (LCID-3), and Bearer-6 (i.e., Bearer ID=6) can be mapped to LCID-4. Each MAC/RF entity at the node can communicate with (or correspond to) a MAC/RF entity at the UE. For example, MAC/RF-1 on the macro eNodeB can correspond to MAC/RF-1 on the UE, and MAC/RF-2 on the macro eNodeB can correspond to MAC/RF-2 on the UE.

At the UE, each MAC/RF entity can receive and process data for the multiple radio bearers (e.g., EPS bearers). Data from each radio bearer can be combined or assembled at the RLC or MAC-RLC SAP. A separate RLC processing flow can be used for each LCID (or EPS bearer). For instance, RLC flow 1 can be used for LCID-3 (LCID=3) data and RLC flow 2 can be used for LCID-4 (LCID=4) data. The output from each RLC flow can be sent to the PDCP for additional processing.

Figure 6:
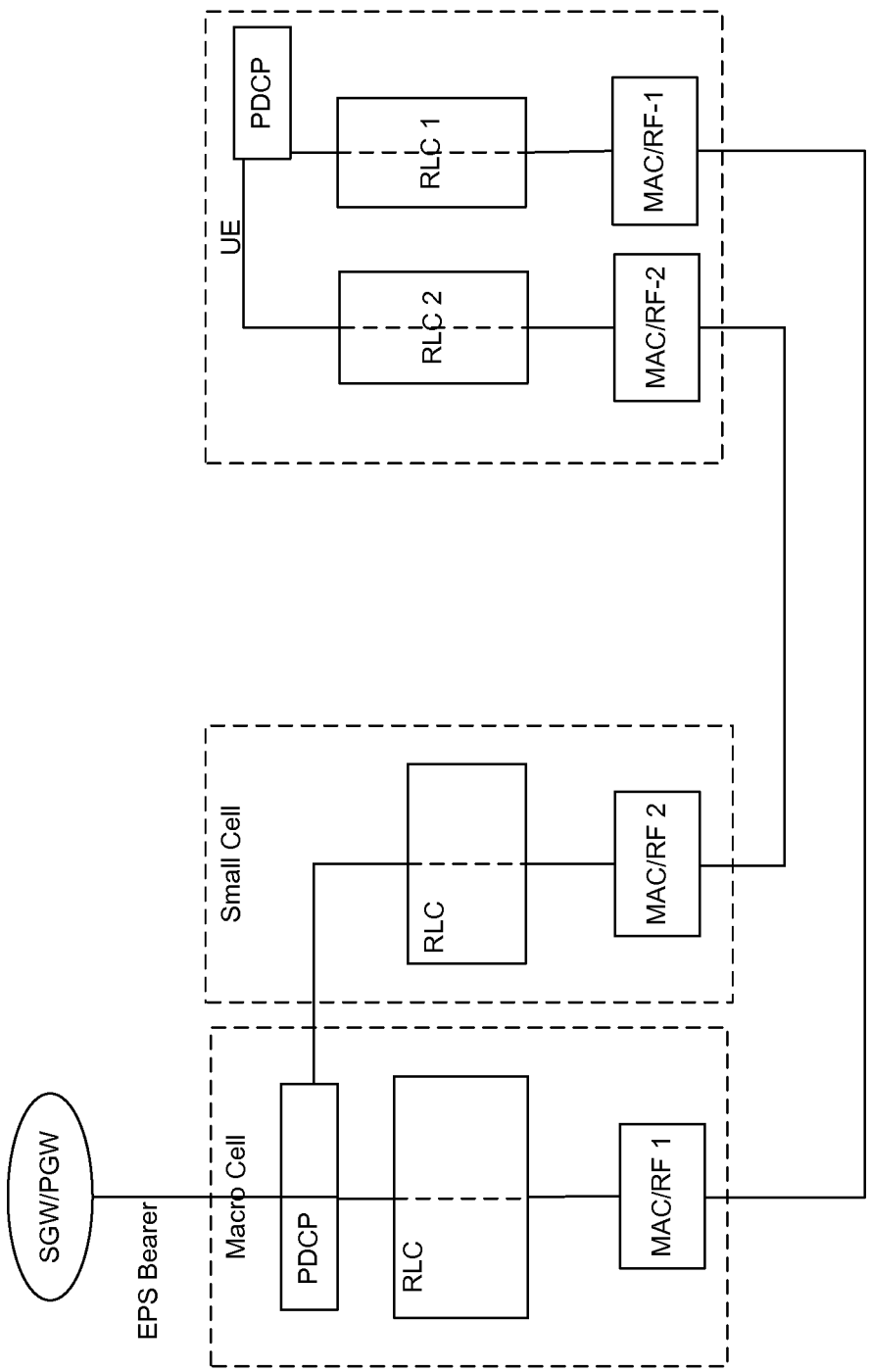
FIG. 6 illustrates a diagram of a user equipment (UE) architecture for dual connectivity with a single bearer in accordance with an example.

The dual connectivity can be useful in a Hetnet, where a UE can be connected to two cells at a same time. For example, dual connectivity can occur when the UE is transmitting or receiving data from both a macro cell and a small cell at the same time. FIG. 6 illustrates a diagram of a user equipment (UE) architecture for dual connectivity with a single bearer. The architecture shown in FIG. 6 provides a PDCP/RLC split. For example, a common PDCP can be used at the macro cell whereas RLC, MAC, and PHY layer processing can be duplicated on the macro and small cell.

For instance, the data of a single EPS bearer can be split at the PDCP into a RLC flow at the macro cell and a RLC flow at the small cell. The MAC/RF-1 entity can process and transmit data from the macro cell node, and the MAC/RF-2 entity can process and transmit data from the small cell node. At the UE, each MAC/RF entity can have a dedicated RLC entity. For example, MAC/RF-1 entity can pass data up the layers to the RLC 1 entity, and MAC/RF-2 entity can pass data up the layers to the RLC 2 entity. The data can be assembled at the PDCP of the UE.

Using the architecture shown in FIG. 6, the PDCP can be common for the cells and the PDCP can reside at macro node. In an example, each RLC entity at the nodes can be paired with an RLC entity at the UE. So, one of the two RLC entities (i.e., RLC 1) at the UE can be paired with the RLC entity on the macro node and the other RLC entity (i.e., RLC 2) can be paired with the RLC entity on the small cell. Data can be split between the macro node and small cell node and pass through the two RLC entities on both sides.

Figure 7:
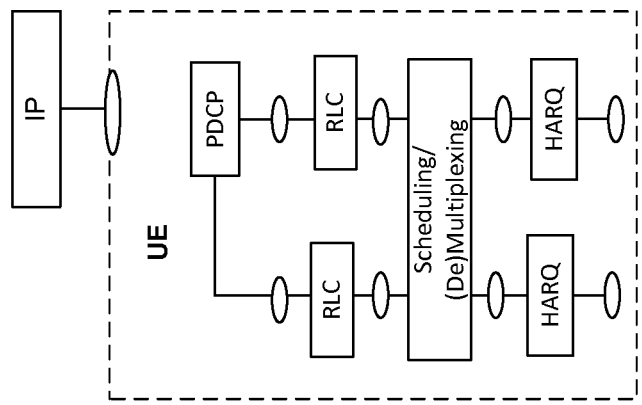
FIG. 7 illustrates a diagram of a user equipment (UE) architecture for dual connectivity in accordance with an example.
Figure 7:
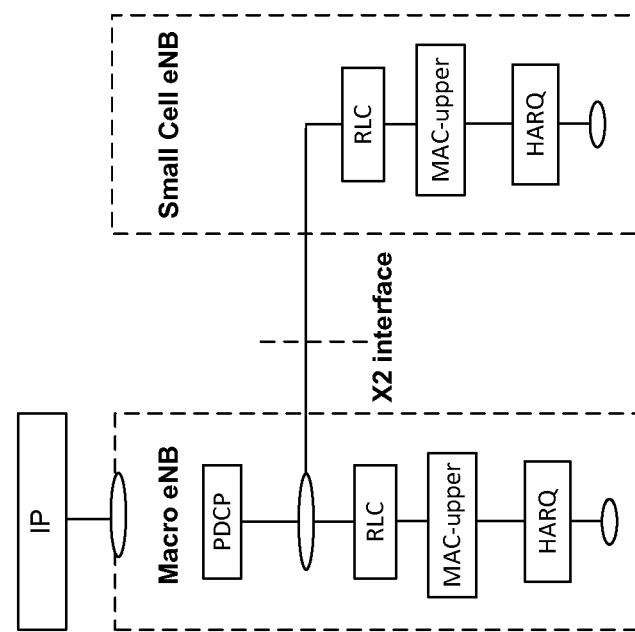

FIG. 7 illustrates another UE architecture for dual connectivity. The MAC functionally may be separated between upper MAC (MAC-upper or scheduling/(de)multiplexing) and lower MAC (e.g., HARQ) functionality. The data may be split between the PDCP and RLC. The data from the macro eNB can be transmitted to the small cell eNB via the X2 interface or other backhaul interface. The ovals can represent SAP between entities.

Figure 8:
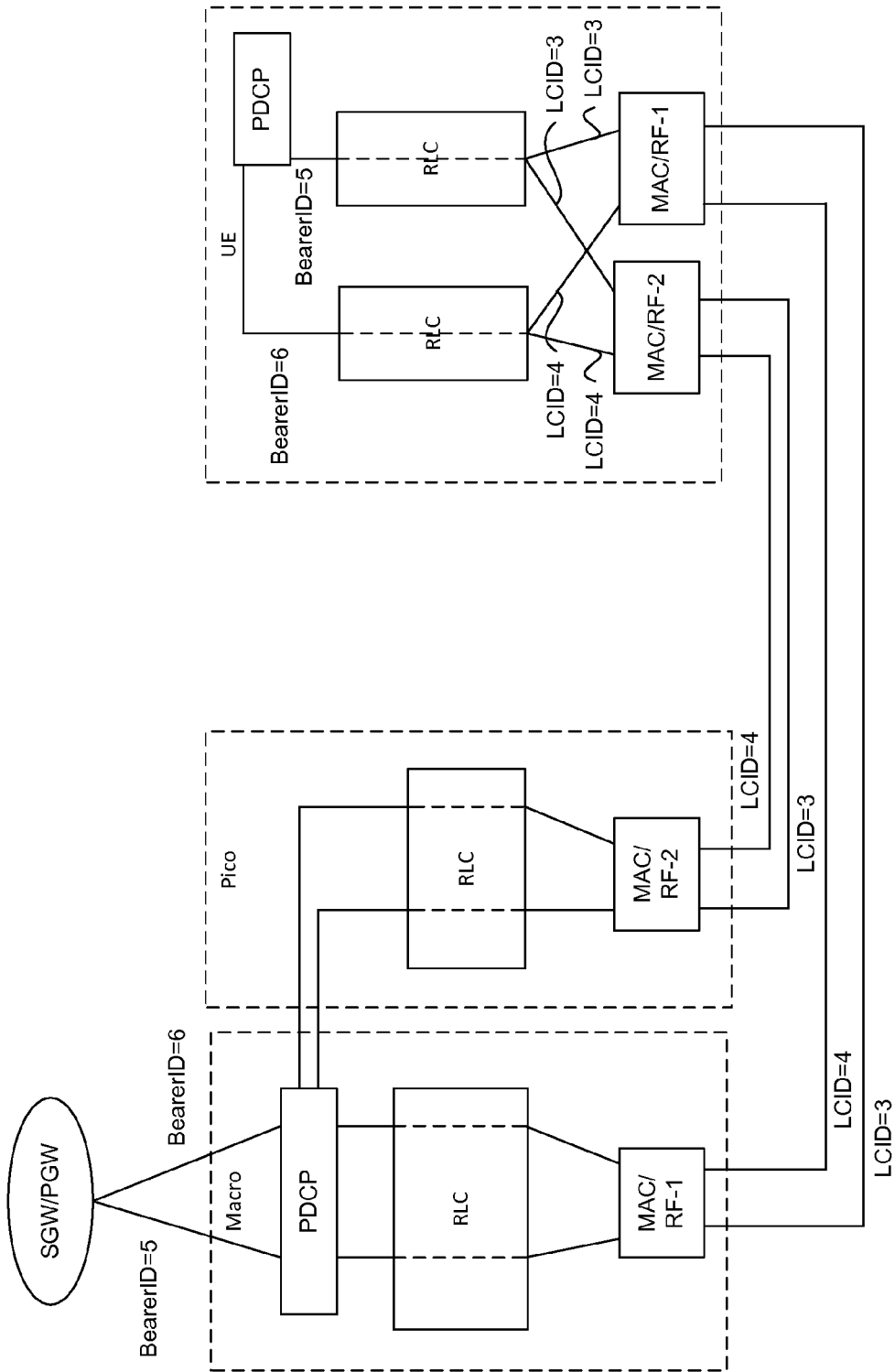
FIG. 8 illustrates a diagram of a user equipment (UE) architecture to support dual connectivity with multiple radio link control (RLC) entities and multiple evolved packet system (EPS) bearers into different cells in accordance with an example.

FIG. 8 illustrates an example of a dual RLC architecture with multiple EPS bearers split into different cells. For example, the core network (e.g., SGW/PGW) can send data (e.g., packets) to a macro node (e.g., macro eNodeB) split between two radio bearer (e.g. Bearer ID=5 and Bearer ID=6). The PDCP can process each radio bearer data stream and can split the data from each radio bearer data stream to a RLC entity on the macro node and a RLC entity on the pico node. Each RLC entity can pass the data to the MAC/RF entity. The MAC/RF-1 entity on the macro node can process and transmit the data via an air interface to the MAC/RF-1 entity on the UE, and the MAC/RF-2 entity on the pico node can process and transmit the data via an air interface to the MAC/RF-2 entity on the UE. Each MAC/RF entity can process and transmit data via multiple radio bearers (e.g., EPS bearers). For instance, Bearer-5 (i.e., Bearer ID=5) can be mapped to LCID-3 (LCID=3), and Bearer-6 (i.e., Bearer ID=6) can be mapped to LCID-4 (LCID=4).

At the UE, each MAC/RF entity can receive and process data for the multiple radio bearers (e.g., EPS bearers). Data from each radio bearer can be combined or assembled at a RLC entity, where a separate RLC entity can be used for each LCID (or EPS bearer). The output from each RLC entity can be sent to the PDCP for additional processing.

An architecture having separate RLC entities (e.g., FIGS. 6-8) and a common PDCP can have various advantages and benefits. For example, the security context can be common to both connections. The IP connection towards the SGW/PGW may not be impacted as the UE moves from one small cell (e.g, LPN or pico cell) to another small cell. Since the small cell may maintain its own RLC/MAC entities, delay in time sensitive segmentation (SGMT) and/or ARQ functionality can be reduced. The X2 interface traffic load may increase from a single node configuration but, the traffic load can be less than an architecture where a common RLC is used at the macro cell for the macro cell and the small cell (e.g., FIG. 4).

A challenge for the architecture having separate RLC entities at the nodes can be that two RLC entities may be used at the UE, which UE RLC entities may pair with the two peer RLC entities on the network side (e.g., one RLC entity in the macro and the other RLC entity in the small cell). Separate RLC entities in the UE may add additional complexity in entity management, configuration, and data handling from a carrier aggregation architecture where a single RLC entity is used. Using RLC groups in a single RLC entity instead of separate RLC entities at the UE allows the UE to use a carrier aggregation architecture (or CoMP architecture) without the additional complexity in entity management, configuration, and data handling.

A mechanism to support dual connectivity under a centralized PDCP can be grouping RLC flows based on a MAC/PHY interface used. With the grouping of the RLC flows, the UE can maintain a same legacy CA architecture (i.e., common protocol stack with one RLC entity). Multiple RLC flows can be setup for a same bearer to pair with RLC entities on the macro and the small cell. For instance, one RLC flow (e.g., group 0 or RLC-group 0) can be paired with the RLC on the macro cell and another RLC flow (e.g., group 1 or RLC-group 1) can be paired with the RLC on the small cell. RLC flows belonging to a same bearer can be grouped to form a virtual RLC flow at the UE. The data can be processed through a virtual RLC flow as though data was in a single RLC flow.

Each RLC entity on the network side (e.g., node RLC entity) can be assigned an RLC group identifier (RGI). In an example, the RLC group identifier (ID) can be implemented in a standard (e.g., 3GPP LTE). Each RGI can identify the cell transmitting a logical channel (e.g., with a logical channel ID (LCID)). For example, RGI=0 can be assigned to data from a macro cell, and RGI=1 can be assigned to data from a small cell. A MAC entity on the UE can be configured with the RLC group associated with the cell that the MAC entity receives data from. For instance with CA, both MAC entities (e.g., MAC/RF 1 and MAC/RF 2) on the UE can be associated with RLC group-0. In a case of dual connectivity, the MAC entity (e.g., MAC/RF 1) in communication with the macro node can be configured with RLC group-0, whereas MAC entity (e.g., MAC/RF 2) in communication with the pico node can be configured with RLC group-1.

Figure 9:
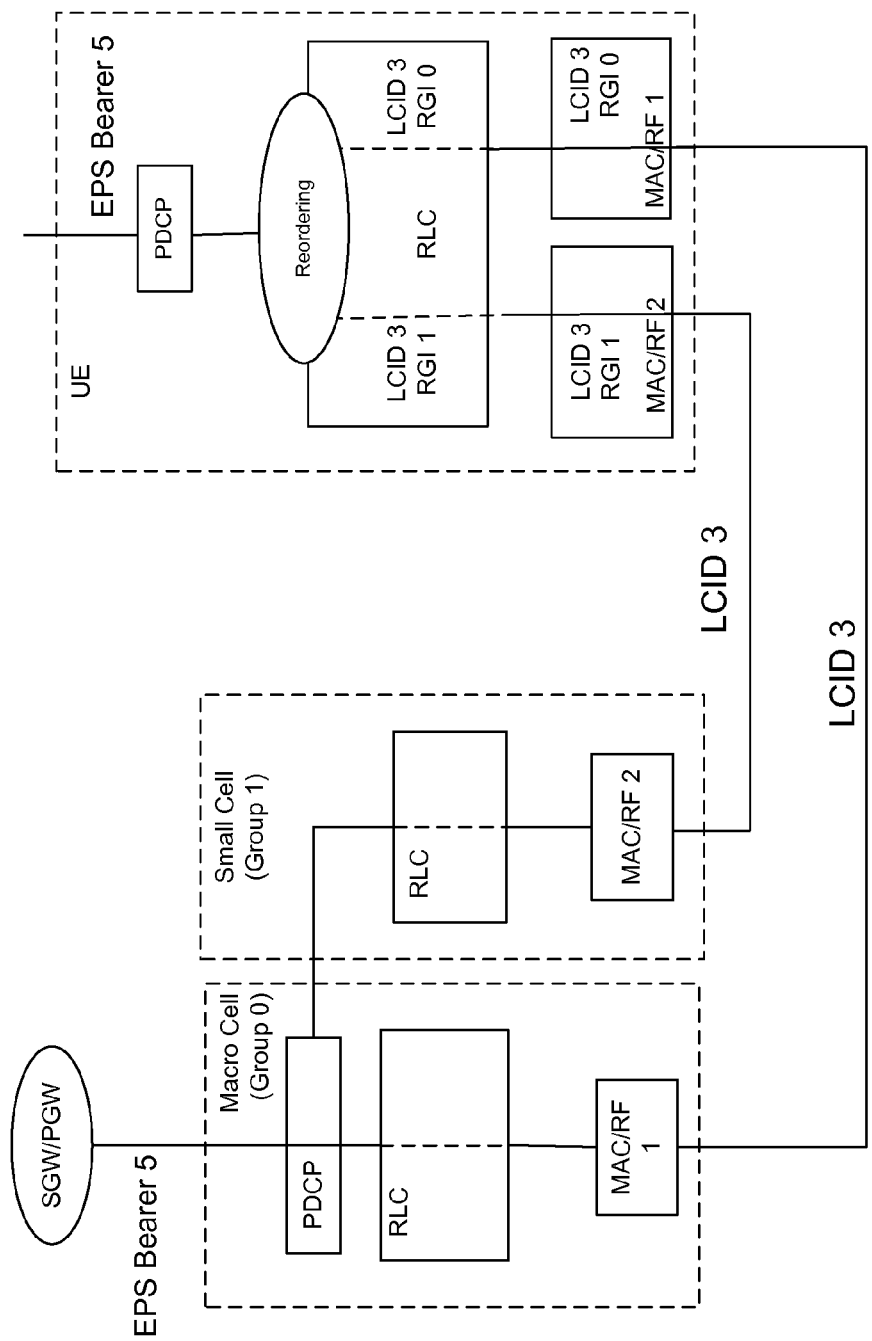
FIG. 9 illustrates a diagram of an architecture to support dual connectivity with radio link control (RLC) groups in accordance with an example.

The network (e.g., EPC or CN) can configure as many RLC flows (e.g., with RLC flows identifiers (RFI)) on the UEs as RLC flows exist (i.e., configured) on the network side (e.g., nodes). In case of a split bearer, each DRB can result in at least two RLC flows, as shown in FIG. 9. FIG. 9 illustrates a configuration to support dual connectivity with multiple radio link control (RLC) groups for a single evolved packet system (EPS) bearer. Each RLC flow can be assigned corresponding RGI and radio bearer identifier (e.g., RLC bearer identifier (ID) based on EPS bearer ID). UE RLC flows belonging to the same EPS bearer can be grouped to form a virtual RLC flow. Data can flow through these virtual RLC flows to PDCP.

As shown in FIG. 9, the MAC/RF 1 entity can be associated with RGI 0 and the MAC/RF 2 entity can be associated with RGI 1 for LCID 3. The RLC at the UE or the RLC SAP can provide reordering of the LCID 3 SDUs for the PDCP.

Figure 10:
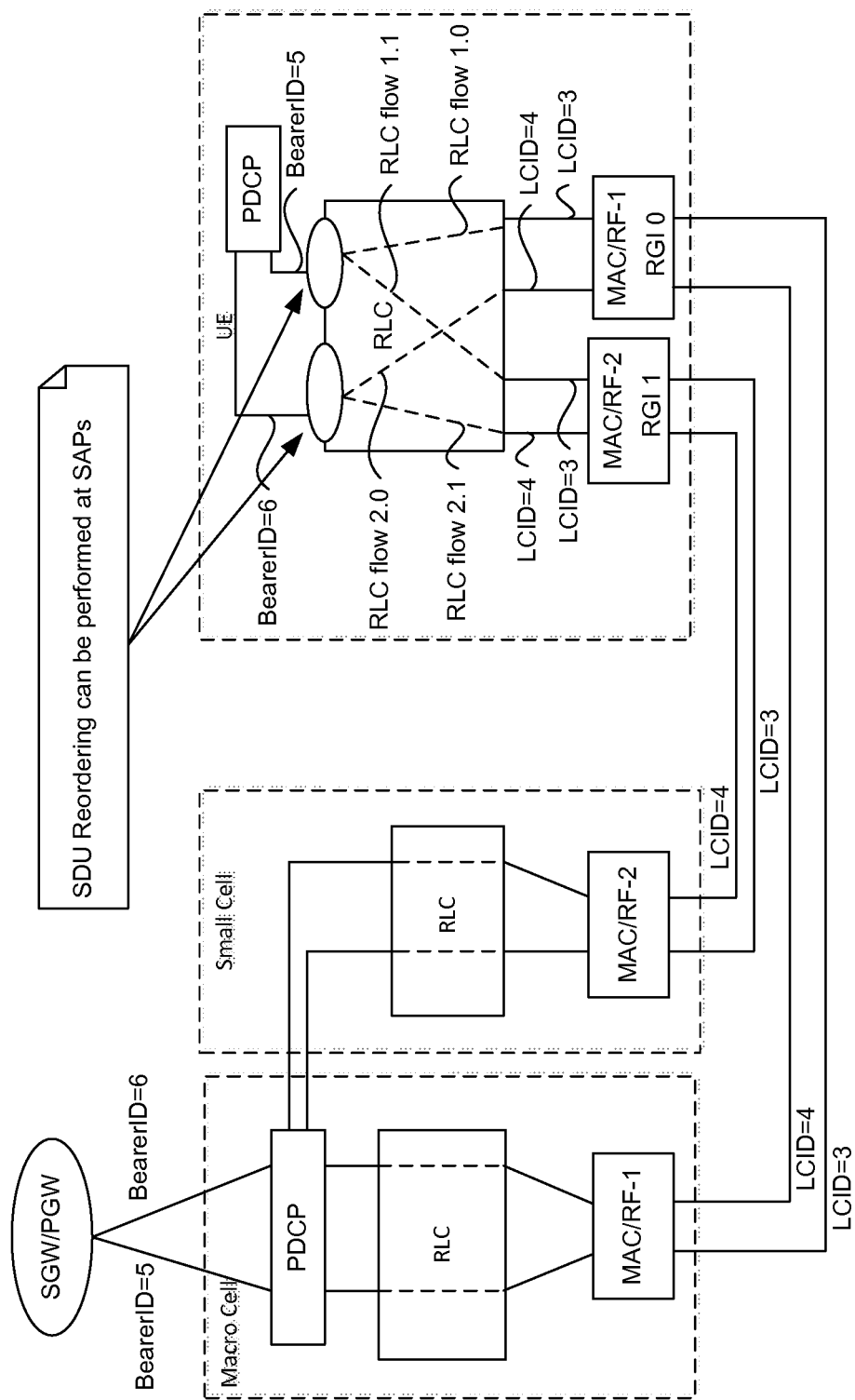
FIG. 10 illustrates a diagram of radio link control (RLC) groups for multiple evolved packet system (EPS) bearers in accordance with an example.

FIG. 10 illustrates an architecture with RLC groups for multiple EPS bearers in a Hetnet. A common PDCP can be used, which can be located in the macro cell (or macro node). A total of four RLC flows can exist on the network side (i.e., two RLC flows on the macro cell for each bearer and two RLC flows on the small cell for each bearer). Each bearer (e.g., Bearer ID=5 and Bearer ID=6) can be split and passed through both the macro cell and the small cell.

In an example, the network can configure four RLC flows on the UE. The four RLC flows on the UE can be configured to pair with peer RLC flows on the network side. The RLC flow-1 (or RLC flow 1.0) can have an RFI=1.0, RGI=0, and Flow ID=1, which can handle EPS Bearer-5 from the macro cell. The RLC flow-2 (or RLC flow 2.0) can have an RFI=2.0, RGI=0, Flow ID=2, which can handle EPS Bearer-6 from the macro cell. The RLC flow-3 (or RLC flow 1.1) can have an RFI=1.1, RGI=1, and Flow ID=1, which can handle EPS Bearer-5 from the small cell. The RLC flow-4 (or RLC flow 2.1) can have an RFI=2.1, RGI=1, and Flow ID=2, which can handle EPS Bearer-6 from the small cell.

The MAC in communication with the macro cell can be configured with RGI=0 (or RG-0) and the MAC entity in communication with the small call can be configured with RGI=1 (or RG-1). The data can split between two MAC/PHY entities (e.g., MAC/RF 1 and MAC/RF 2). Each MAC/PHY entity at the UE can feed data to RLC flows based on RLC group (RG) and LCID (corresponding to an EPS bearer). The SDUs from RLC flows belonging to the same RFI can be reordered either at PDCP or a RLC SAP.

Figure 11:
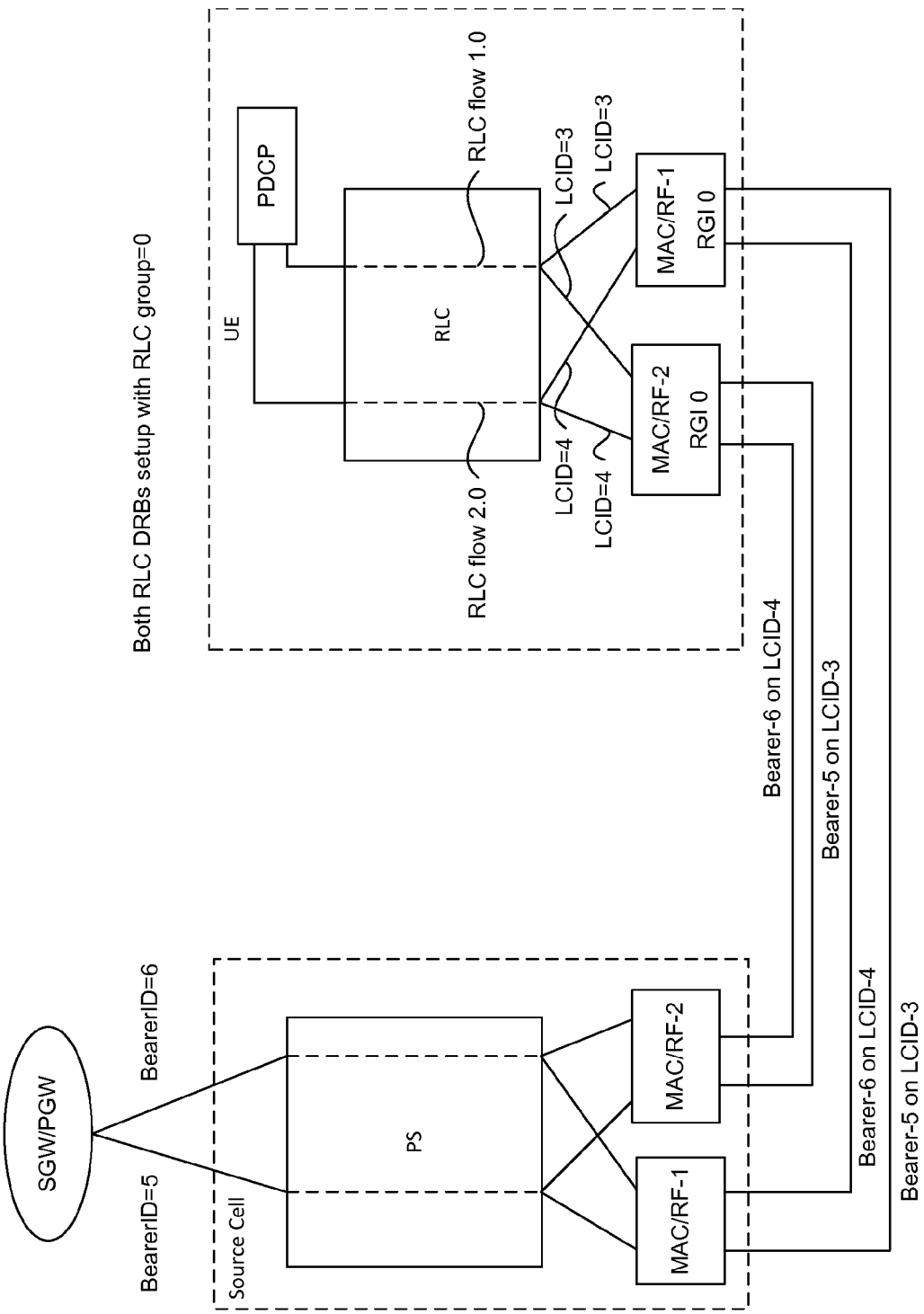
FIG. 11 illustrates a diagram of a backward compatible carrier aggregation (CA) architecture with radio link control (RLC) groups for multiple split evolved packet system (EPS) bearers in accordance with an example.

FIG. 11 illustrates a backward compatible CA architecture with RLC groups for multiple split EPS bearers, which can be used with a legacy configuration. For example, for two EPS bearers (e.g., Bearer ID=5 and Bearer ID=6) can be routed through a legacy CA capable source cell (e.g., macro cell) to a CA capable UE. On the network side, the EPS bearer flows can be routed through two RLC flows (e.g., RLC flow 1.0 and RLC flow 2.0).

In an example, the network can configure two RLC flows on the UE. The two RLC flows on the UE can be configured to pair with peer flows on the network side. Each flow can be given RGI=0 since both RLC DRB flows use a same RLC entity on the macro cell. Since the RGI is the same (RLC group=0), the UE can ignore RGI information and behave in a legacy CA configuration. Each RLC flow can have a different RLC bearer ID (RBID). For instance, one RLC flow can have a bearer ID=1 that is connected to EPS bearer ID-5. A second RLC flow can have a bearer ID=2 that is connected to EPS bearer ID-6. Both MAC entities (e.g., MAC/RF 1 and MAC/RF 2) on the UE can be configured with RLC group=0 (i.e., RGI=0). Data can be split between the two MAC/PHY entities. Each MAC/PHY entity can feed data to the RLC flows based on the data's RLC group and LCID.

In another example, a CA architecture can be coupled with a Hetnet configuration, where CA can be applied to each node (where CA was described for a single node). A combined CA Hetnet architecture may result is a greater number of RLC flows.

Figure 12:
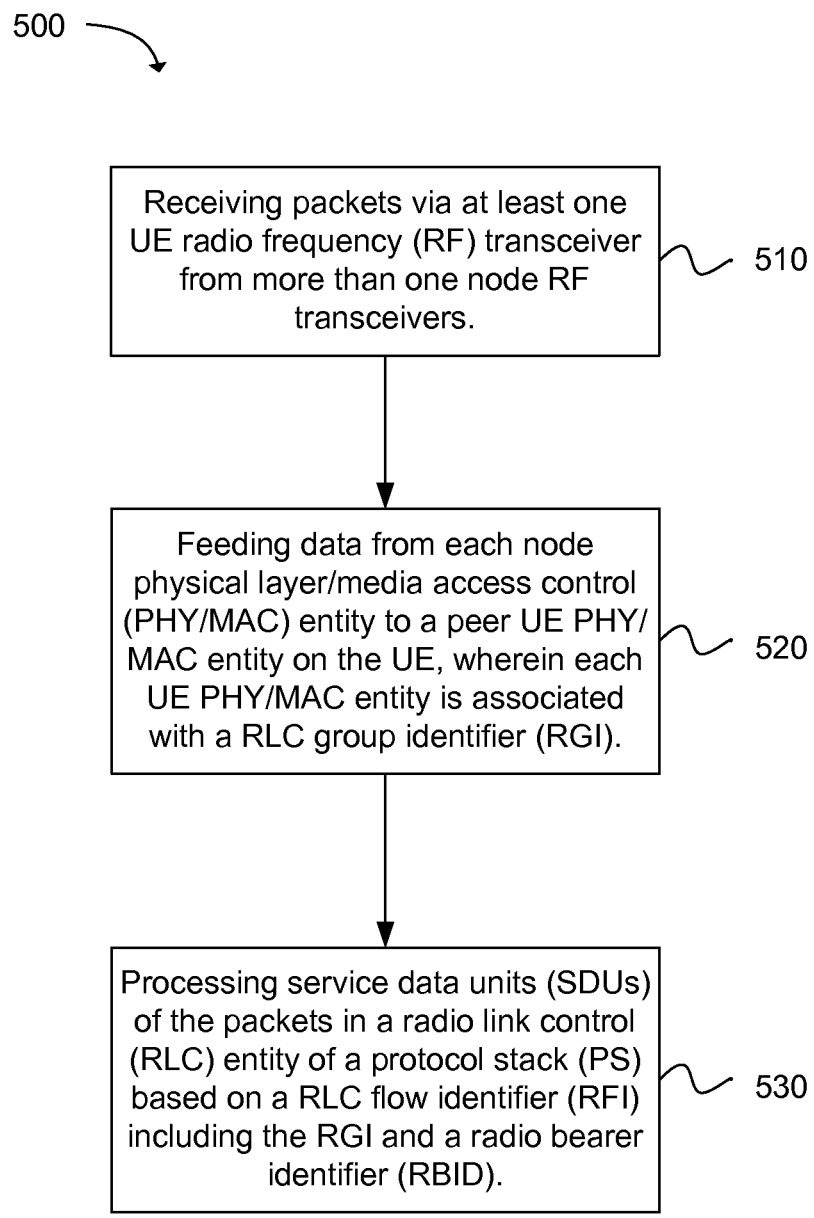
FIG. 12 depicts a flow chart of a method for processing radio link control (RLC) flows at a user equipment (UE) in accordance with an example.

Another example provides a method 500 for processing radio link control (RLC) flows at a user equipment (UE), as shown in the flow chart in FIG. 12. The method may be executed as instructions on a machine, computer circuitry, or a processor for the UE, where the instructions are included on at least one computer readable medium or one non-transitory machine readable storage medium. The method includes the operation of receiving packets via at least one UE radio frequency (RF) transceiver from more than one node RF transceivers, as in block 510. The operation of feeding data from each node physical layer/media access control (PHY/MAC) entity to a peer UE PHY/MAC entity on the UE, wherein each UE PHY/MAC entity is associated with a RLC group identifier (RGI) follows, as in block 520. The next operation of the method can be processing service data units (SDUs) of the packets in a radio link control (RLC) entity of a protocol stack (PS) based on a RLC flow identifier (RFI) including the RGI and a radio bearer identifier (RBID), as in block 530.

In an example, the operations of receiving the packets and feeding data can further include processing the packets in at least two UE PHY/MAC entities. Each UE RF transceiver can be associated with a UE PHY/MAC entity. The packets can be split between the UE RF transceivers. In another example, the operation of processing the SDU can further include assigning the RGI and the RBID to the RFI. The radio bearer ID can be based on an evolved packet system (EPS) bearer identifier (ID), RLC bearer ID, or logical channel ID (LCID).

In another configuration, the operation of receiving the packets can further include receiving the packets using at least two logical channel identifiers (LCIDs) for at least one data radio bearers (DRBs). The RGI can indicate a separate RLC flow based on a DRB or an LCID. The operation of processing the SDUs can further include grouping data from the packets to a virtual RLC flow based on the RFI determined by the RGI indicating the node RF transceiver and a flow identifier (ID) indicating the DRB. The node RF transceivers can include a macro cell RF transceiver and a small cell RF transceiver. The UE can be configured to simultaneously connect to the macro cell RF transceiver and the small cell RF transceiver. A macro cell RGI can be a different RGI from a small cell RGI.

In another example, operation the node RF transceivers located on a same cell node can use a same RGI. The method can further include feeding MAC SDUs at a single RLC entity into various virtual RLC flows. A virtual RLC flow can be associated with each evolved packet system (EPS) bearer identifier (ID). The MAC SDU can be received from the UE PHY/MAC entity. In another configuration, the method can further include reordering RLC SDUs at a packet data convergence protocol (PDCP) entity or an RLC service access point (SAP) to the PDCP based on a virtual RLC flow indicated by the RBID. The PDCP entity can receive a separate data flow for each data radio bearer (DRB). The RLC SDU can be processed by the RLC entity.

In another example, the method can further include: associating a RGI to the SDU at the UE PHY/MAC entity; and forwarding the SDU including the RGI to a RLC flow at the RLC entity. In another configuration, the received packets include the RGI in a packet header. In another example, the method can further include receiving a network parameter associating each node RF transceiver (or MAC/PHY entity) with a specified cell and RGI.

Figure 13:
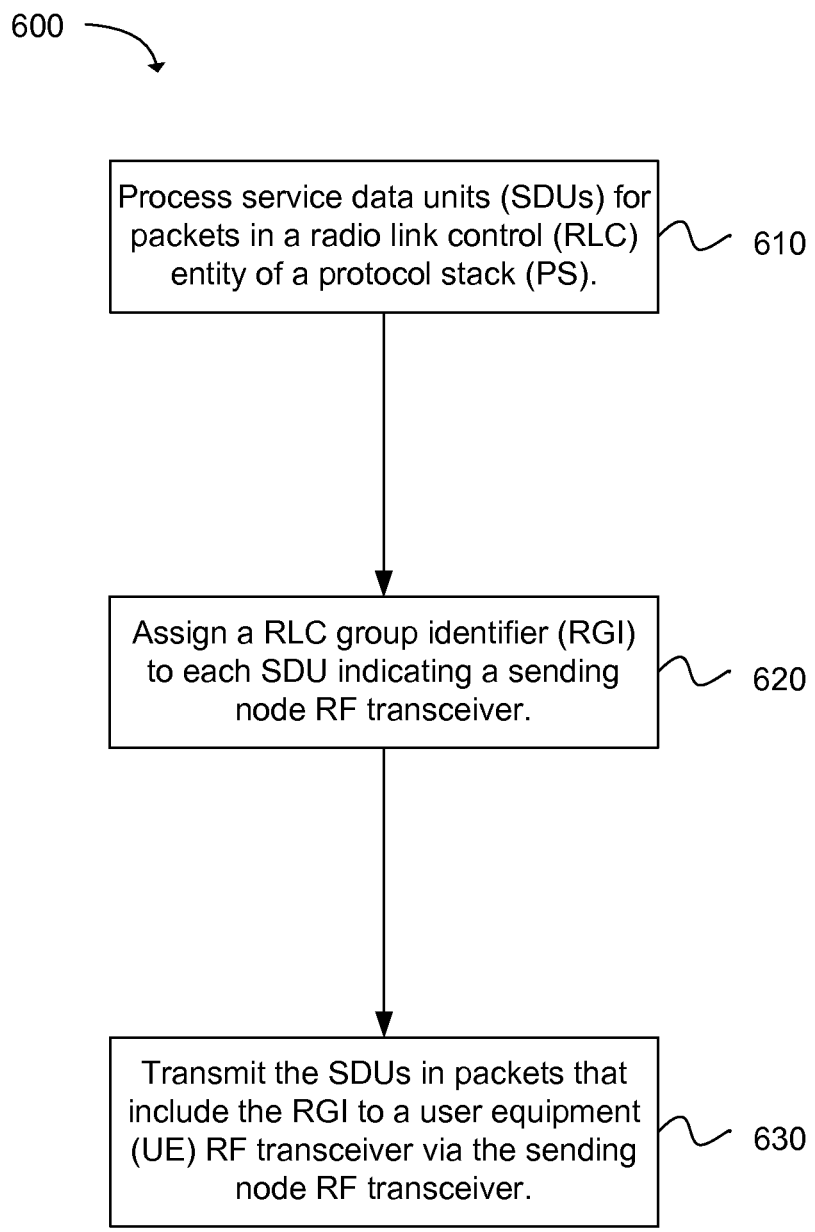
FIG. 13 depicts functionality of computer circuitry of a node operable to support radio link control (RLC) groups in accordance with an example.

Another example provides functionality 600 of computer circuitry on a node operable to support radio link control (RLC) groups, as shown in the flow chart in FIG. 13. The functionality may be implemented as a method or the functionality may be executed as instructions on a machine, where the instructions are included on at least one computer readable medium or one non-transitory machine readable storage medium. The computer circuitry can be configured to process service data units (SDUs) for packets in a radio link control (RLC) entity of a protocol stack (PS), as in block 610. The computer circuitry can be further configured to assign a RLC group identifier (RGI) to each SDU indicating a sending node RF transceiver, as in block 620. The computer circuitry can also be configured to transmit the SDUs in packets that include the RGI to a user equipment (UE) RF transceiver via the sending node RF transceiver, as in block 630.

In an example, the sending node RF transceivers can include a macro cell RF transceiver and a small cell RF transceiver. The UE can be configured to simultaneously connect to the macro cell RF transceiver and the small cell RF transceiver. A macro cell RGI can be a different RGI from a small cell RGI. In another example, the node RF transceivers located on a same cell node can use a same RGI. In a configuration, the transmitted packets can include the RGI in a packet header.

In another example, the computer circuitry can be further configured to send a network parameter to a UE associating each node RF transceiver with a specified cell. In another configuration, the computer circuitry configured to process the SDUs can be further configured to receive packets via at least one evolved packet system (EPS) bearers. The node can include a macro node, small cell node, a low power node (LPN), a pico node, a femto node, a base station (BS), a Node B (NB), an evolved Node B (eNB), a baseband unit (BBU), a remote radio head (RRH), a remote radio equipment (RRE), a remote radio unit (RRU), or a central processing module (CPM).

Figure 14:
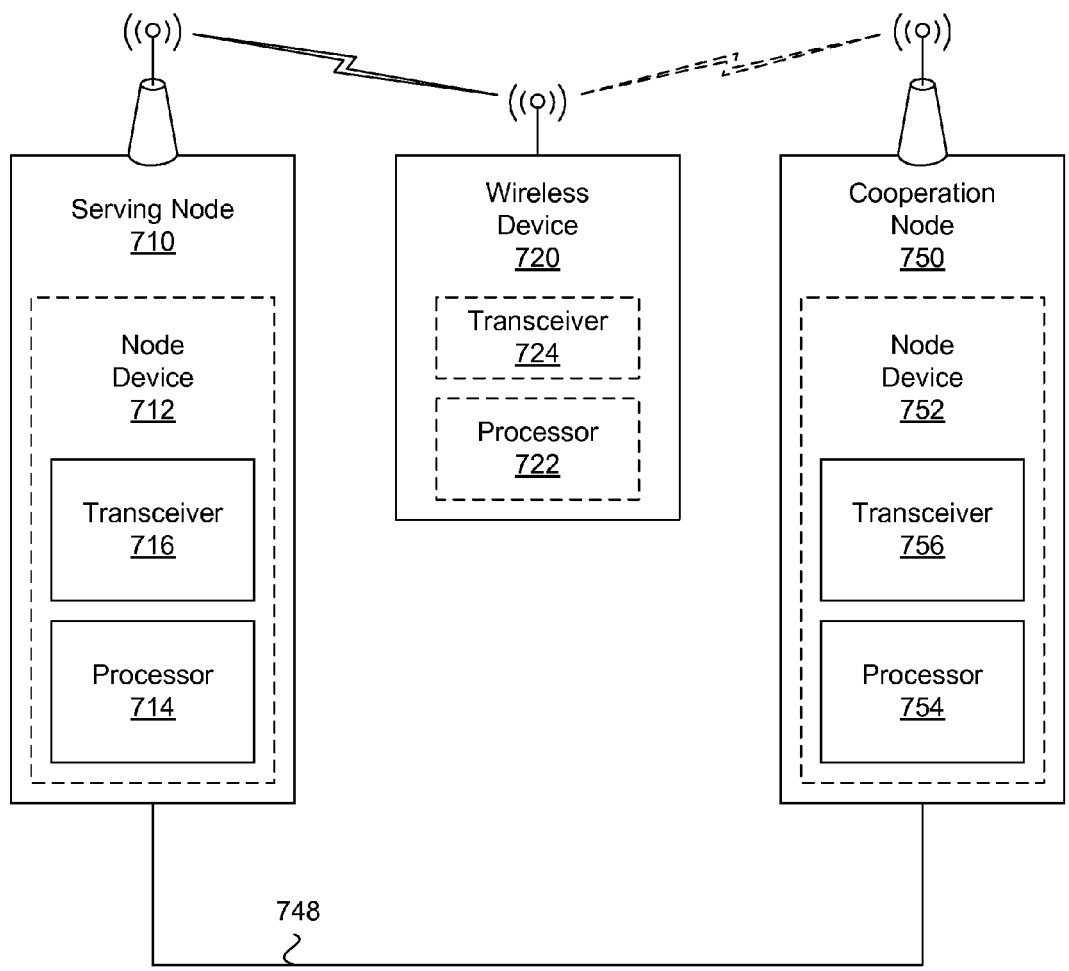
FIG. 14 illustrates a block diagram of a serving node, a coordination node, and wireless device (e.g., UE) in accordance with an example.

FIG. 14 illustrates an example node (e.g., serving node 710 and cooperation node or second serving node 750), such as an eNB, and an example wireless device 720 (e.g., UE). The node can include a node device 712 and 752. The node device or the node can be configured to communicate with the wireless device. The node device, device at the node, or the node can be configured to communicate with other nodes via a backhaul link 748 (optical or wired link), such as an X2 application protocol (X2AP). The node device can include a processor 714 and 754 and a transceiver 716 and 756. In an example, the node device can be operable to support radio link control (RLC) groups, as described in 600 of FIG. 13.

The wireless device 720 (e.g., UE) can include a transceiver 724 and a processor 722. The wireless device (i.e., device) can be configured for processing radio link control (RLC) flows, as described in 500 of FIG. 12.

In another example, the carrier aggregation (CA) capable user equipment (UE). The transceiver 724 can include a UE radio frequency (RF) transceiver and be configured to receive packets from more than one cell via a sending node RF transceiver. The processor 722 can be configured to process service data units (SDU) of the packets in a radio link control (RLC) entity of a protocol stack (PS). Each SDU can be associated with an RLC flow identifier (RFI). The RFI can include an RLC group identifier (RGI) indicating the sending node RF transceiver, and a radio bearer identifier (RBID).

In an example, the sending node RF transceiver can include a macro cell RF transceiver at a macro node and a small cell RF transceiver at a small cell node. The UE can be configured to simultaneously connect to the macro cell RF transceiver and the small cell RF transceiver. A macro cell RGI can be a different RGI from a small cell RGI. In another example, a same RGI can be associated with the sending node RF transceiver located on a same cell node as another sending node RF transceiver. In another configuration, the UE RF transceiver can be further configured to receive the packets via at least one evolved packet system (EPS) bearer or logical channel identifier (LCID). The processor 722 can be further configured to process media access control (MAC) SDUs into various RLC flows based on the RFI for a MAC SDU. The MAC SDU can be received from the MAC entity.

In another example, the processor 722 can be further configured to feed media access control (MAC) SDUs at a single RLC entity into various virtual RLC flows. A virtual RLC flow can be associated with each evolved packet system (EPS) bearer or logical channel identifier (LCID). The MAC SDU can be received from the MAC entity. In another configuration, the processor can be further configured to reorder RLC SDUs at a packet data convergence protocol (PDCP) entity or an RLC service access point (SAP) to the PDCP based on a virtual RLC flow indicated by the RBI. The PDCP entity can receive a separate RLC flow for each evolved packet system (EPS) bearer or logical channel identifier (LCID). The RLC SDU can be processed by the RLC entity.

In another example, the processor 722 can be further configured to: associate a RGI to the SDU at a media access control (MAC) based on the node RF transceiver transmitting the packet; and forward the SDU including the RGI to a RLC flow at the RLC entity. In another configuration, the UE RF transceiver can be further configured to receive a network parameter associating each node RF transceiver with a specified cell and RGI.

Figure 15:
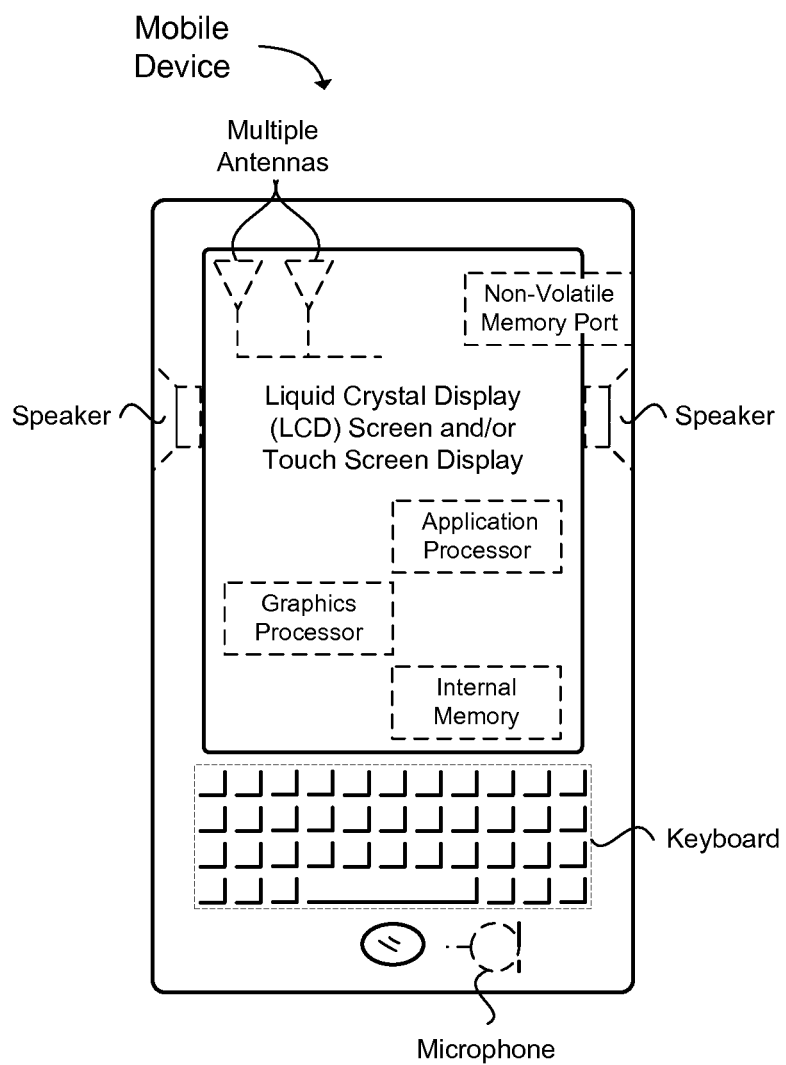
FIG. 15 illustrates a diagram of a wireless device (e.g., UE) in accordance with an example.

FIG. 15 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 15 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A carrier aggregation (CA) capable user equipment (UE) to process radio link control (RLC) groups, comprising:
a UE radio frequency (RF) transceiver configured to:
receive packets from more than one cell via a sending node RF transceiver, wherein the sending node RF transceiver includes a macro cell RF transceiver at a macro node and a small cell RF transceiver at a small cell node, and the UE is configured to simultaneously connect to the macro cell RF transceiver and the small cell RF transceiver; and
a processor configured to:
process service data units (SDU) of the packets in a radio link control (RLC) entity of a protocol stack (PS), wherein each SDU is associated with an RLC flow identifier (RFI), where the RFI comprises:
an RLC group identifier (RGI) indicating the sending node RF transceiver, wherein the sending node RF transceiver includes the macro node and the small cell node; and
a radio bearer identifier (RBID); and
process media access control (MAC) SDUs into various RLC flows based on the RFI for a MAC SDU, wherein the MAC SDU is received from a MAC entity.

2. The UE of claim 1, wherein a macro cell RGI is a different RGI from a small cell RGI.

3. The UE of claim 1, wherein a same RGI is associated with the sending node RF transceiver located on a same cell node as another sending node RF transceiver.

4. The UE of claim 1, wherein:
the UE RF transceiver is further configured to:
receive the packets via at least one evolved packet system (EPS) bearer or logical channel identifier (LCID).

5. The UE of claim 1, wherein:
the processor is further configured to:
feed media access control (MAC) SDUs at a single RLC entity into various virtual RLC flows, wherein a virtual RLC flow is associated with each evolved packet system (EPS) bearer or logical channel identifier (LCID), and wherein the MAC SDU is received from the MAC entity.

6. The UE of claim 1, wherein:
the processor is further configured to:
reorder RLC SDUs at a packet data convergence protocol (PDCP) entity or an RLC service access point (SAP) to the PDCP based on a virtual RLC flow indicated by the RBID, wherein the PDCP entity receives a separate RLC flow for each evolved packet system (EPS) bearer or logical channel identifier (LCID), wherein the RLC SDU is processed by the RLC entity.

7. The UE of claim 1, wherein:
the processor is further configured to:
associate a RGI to the SDU at a media access control (MAC) based on the node RF transceiver transmitting the packet; and
forward the SDU including the RGI to a RLC flow at the RLC entity.

8. The UE of claim 1, wherein:
a UE RF transceiver of CA capable UE is further configured to:
receive a network parameter associating each node RF transceiver with a specified cell and RGI.

9. The UE of claim 1, wherein the UE includes an antenna, a camera, a touch sensitive display screen, a speaker, a microphone, a graphics processor, an application processor, internal memory, or a non-volatile memory port.

10. A method for processing radio link control (RLC) flows at a user equipment (UE), comprising:
receiving packets via at least one UE radio frequency (RF) transceiver from more than one node RF transceivers, wherein the node RF transceivers includes a macro node and small cell node, and wherein the node RF transceivers include a macro cell RF transceiver and a small cell RF transceiver, and the UE is configured to simultaneously connect to the macro cell RF transceiver and the small cell RF transceiver;
feeding data from each node physical layer/media access control (PHY/MAC) entity to a peer UE PHY/MAC entity on the UE, wherein each UE PHY/MAC entity is associated with a RLC group identifier (RGI);
processing service data units (SDUs) of the packets in a radio link control (RLC) entity of a protocol stack (PS) based on a RLC flow identifier (RFI) including the RGI and a radio bearer identifier (RBID); and
processing MAC SDUs into various RLC flows based on the RFI for a MAC SDU, wherein the MAC SDU is received from a MAC entity.

11. The method of claim 10, wherein receiving the packets and feeding data further comprises:
processing the packets in at least two UE PHY/MAC entities, wherein each UE RF transceiver is associated with a UE PHY/MAC entity, and the packets are split between the UE RF transceivers.

12. The method of claim 10, wherein processing the SDU further comprises:
assigning the RGI and the RBID to the RFI, wherein the radio bearer ID is based on an evolved packet system (EPS) bearer identifier (ID), RLC bearer ID, or logical channel ID (LCID).

13. The method of claim 10, wherein:
receiving the packets further comprises:
receiving the packets using at least two logical channel identifiers (LCIDs) for at least one data radio bearers (DRBs), wherein the RGI indicates a separate RLC flow based on a DRB or an LCID; and processing the SDUs further comprises:

grouping data from the packets to a virtual RLC flow based on the RFI determined by the RGI indicating the node RF transceiver and a flow identifier (ID) indicating the DRB.

14. The method of claim 10, wherein a macro cell RGI is a different RGI from a small cell RGI.

15. The method of claim 10, wherein the node RF transceivers located on a same cell node use a same RGI.

16. The method of claim 10, further comprising: feeding MAC SDUs at a single RLC entity into various virtual RLC flows, wherein a virtual RLC flow is associated with each evolved packet system (EPS) bearer identifier (ID), and the MAC SDU is received from the UE PHY/MAC entity.

17. The method of claim 10, further comprising:

reordering RLC SDUs at a packet data convergence protocol (PDCP) entity or an RLC service access point (SAP) to the PDCP based on a virtual RLC flow indicated by the RBID, wherein the PDCP entity receives a separate data flow for each data radio bearer (DRB), and the RLC SDU is processed by the RLC entity.

18. The method of claim 10, further comprising:

associating a RGI to the SDU at the UE PHY/MAC entity; and forwarding the SDU including the RGI to a RLC flow at the RLC entity.

19. The method of claim 10, wherein the received packets include the RGI in a packet header.

20. The method of claim 10, further comprising:

receiving a network parameter associating each node RF transceiver with a specified cell and RGI.

21. At least one non-transitory machine readable storage medium comprising a plurality of instructions adapted to be executed to implement the method of claim 10.

22. A node operable to support radio link control (RLC) groups, having computer circuitry configured to:

process service data units (SDUs) for packets in a radio link control (RLC) entity of a protocol stack (PS), wherein each SDU is associated with an RLC flow identifier (RFI), where the RFI comprises:

an RLC group identifier (RGI) indicating a sending node RF transceiver, wherein the sending node RF transceiver includes a macro node and a small cell node; and a radio bearer identifier (RBID);

assign the RGI to each SDU indicating the sending node RF transceiver, transmit the SDUs in packets that include the RGI to a user equipment (UE) RF transceiver via the sending node RF transceiver, wherein the sending node RF transceivers include a macro cell RF transceiver and a small cell RF transceiver, and the UE is configured to simultaneously connect to the macro cell RF transceiver and the small cell RF transceiver; and process media access control (MAC) SDUs into various RLC flows based on the RFI for a MAC SDU, wherein the MAC SDU is received from a MAC entity.

23. The computer circuitry of claim 22, wherein a macro cell RGI is a different RGI from a small cell RGI.

24. The computer circuitry of claim 22, wherein the node RF transceivers located on a same cell node use a same RGI.

25. The computer circuitry of claim 22, wherein the transmitted packets includes the RGI in a packet header.

26. The computer circuitry of claim 22, wherein the computer circuitry is further configured to:

send a network parameter to a UE associating each node RF transceiver with a specified cell.

27. The computer circuitry of claim 22, wherein:

the computer circuitry configured to process the SDUs is further configured to:

receive packets via at least one evolved packet system (EPS) bearers.

28. The computer circuitry of claim 22, wherein the node includes a macro node, small cell node, a low power node (LPN), a pico node, a femto node, a base station (BS), a Node B (NB), an evolved Node B (eNB), a baseband unit (BBU), a remote radio head (RRH), a remote radio equipment (RRE), a remote radio unit (RRU), or a central processing module (CPM).

* * * * *